United States Patent [19]

Tarkkanen

[11] 3,837,807

[45] Sept. 24, 1974

[54] IMPROVED ABSORBENT FOR CARBON-14 DIOXIDE

[75] Inventor: Viekko Tarkkanen, Breda, Netherlands

[73] Assignee: Packard Instrument Company, Inc., Downers Grove, Ill.

[22] Filed: Apr. 7, 1972

[21] Appl. No.: 242,243

[52] U.S. Cl. ......... 23/232 R, 23/230 B, 23/230 PC, 23/230 M, 250/361, 252/301.1 R, 252/301.2 R, 260/501.17, 423/228, 424/1
[51] Int. Cl. ... G01n 31/06, G01n 31/12, G01t 1/10
[58] Field of Search ....... 23/230 PC, 230 B, 230 M, 23/230 R, 230 US, 232 R, 253 PC, 254 R; 252/408, 301.2 SC, 301.2 R, 301.1 R; 423/226, 228; 250/361; 424/1

[56] References Cited
UNITED STATES PATENTS

| | | | |
|---|---|---|---|
| 3,506,828 | 4/1970 | Hansen | 252/408 X |
| 3,711,421 | 1/1973 | Krumbiegel et al. | 23/230 R X |
| 3,726,646 | 4/1973 | Kravetz et al. | 23/230 PC X |

*Primary Examiner*—Joseph Scovronek

[57] ABSTRACT

In the absorption of carbon-14 dioxide gas in a liquid alkaline absorbent preparatory to liquid scintillation counting of the carbon-14 in a scintillation mixture including an aromatic hydrocarbon, the absorbent is a primary alkoxy alkylamine. Enhanced solubility of the carbon-14 dioxide-alkoxy alkylamine carbamate permits the scintillation mixture to be prepared without the hitherto indispensable use of an alcohol, which had caused undesirable chemical quench effects.

7 Claims, No Drawings

IMPROVED ABSORBENT FOR CARBON-14 DIOXIDE

BACKGROUND AND OBJECTS

The present invention relates generally to the absorption of carbon dioxide, and more particularly concerns the absorption of radioactive-carbon-14 dioxide for subsequent liquid scintillation counting. In its principal application, the invention provides an improved absorbent which affords significant advantages over conventional absorbents.

In medical and biological research it is often necessary to determine the carbon-14 radioactivity of samples for radioactive isotope tracer studies. Frequently these samples are insoluble in common liquid scintillation solvents or, even if soluble, the counting efficiency is poor and erratic due to light absorption (quench) caused by the presence of organic molecules (chemical quench) or other colored materials (color quench). Moreover, since carbon-14 is a low energy level radioactive nuclide, if any of the sample is insoluble only a very small fraction of the emitted beta particles can reach the scintillator.

Accordingly, recent attention has been directed to devices for oxidizing the samples in a controlled environment; carbon-14 containing compounds are converted to carbon-14 dioxide gas, and any other radioactive nuclides are converted to other gases (e.g. tritium to tritium dioxide, and sulfur-35 to sulfur-35 dioxide). It is then only necessary to absorb the resulting carbon-14 dioxide in a suitable absorbent, and conduct liquid scintillation counting of the absorbent in an appropriate scintillation mixture. A particularly effective combustion apparatus has recently been described in Kaartinen U.S. Pat. No. 3,485,565, and an condenser system in Kaartinen U.S. Pat. No. 3,542,121.

The most commonly used absorbent has heretofore been ethanolamine (hydroxy ethylamine). This material is a high boiling viscous liquid having satisfactory alkalinity to absorb carbon-14 dioxide and un-labeled carbon dioxide. Ethanolamine is also miscible with monocyclic aromatic hydrocarbons commonly used as primary solvents for the scintillation mixture.

Unfortunately ethanolamine has several disadvantages. The main one is that the reaction product of carbon dioxide and ethanolamine is a carbamate (Noller, "Textbook of Organic Chemistry," pp. 237, 238, Saunders, 1958) formed by the reaction of two mols of carbamate with one of carbon dioxide. This carbamate has only limited solubility in the scintillation mixture of aromatic hydrocarbon and ethanolamine, and for this reason (plus the necessity of washing the viscous ethanolamine from an absorption unit) an alcohol such as methanol must be added to solubilize the carbamate. Alcohols, as is well known, are strong chemical quench media, and thus attenuate the scintillations. This manifests itself in a reduced light collecting efficiency by the scintillation counting device. Accordingly, a primary object of the invention is to provide an improved alkaline absorbent for carbon dioxide, and particularly for carbon-14 dioxide as produced in sample conbustion devices.

Additionally, ethanolamine tends to discolor in use. Another object is to provide alkaline absorbents which are less susceptible to discoloration, and therefore less likely to contribute to color quench effects.

Still another object is to provide a less viscous liquid alkaline absorbent than ethanolamine.

Additionally, it has been found that, in practice, the absorption efficiency of ethanolamine is somewhat limited at high gas flow rates. Presumably, although not certainly, this is due to the high viscosity of ethanolamine. Thus an additional object is to provide a liquid absorbent capable of superior absorption efficiency, particularly at relatively high linear gas flow rates.

Still another object is to provide an alkaline absorbent having a higher capacity for absorbing carbon dioxide than ethanolamine.

Most importantly, a primary object of the invention is to provide a liquid scintillation system which does not require alcohols or other solvents to provide a completely miscible scintillation mixture of aromatic hydrocarbon, alkaline absorbent, and carbon dioxide-absorbent reaction product (carbamate).

SUMMARY OF INVENTION

Briefly, in accordance with the invention, absorption of carbon-14 dioxide in a liquid alkaline absorbent preparatory to liquid scintillation counting of the carbon-14 in a scintillation mixture, is effected with an absorbent comprising a primary alkoxy alkylamine in which the alkoxy group has from 1 to 5 carbon atoms and the alkylamine group has from 2 to 3 carbon atoms. The resulting carbamate forms a solution, without the need for alcohols, when the primary alkoxy alkylamine is mixed with a monocyclic aromatic hydrocarbon as primary solvent to form a scintillation mixture.

DETAILED DESCRIPTION

While the invention will be described in connection with certain preferred embodiments, it will be understood that it is not intended to limit the invention to these particular embodiments. On the contrary, it is intended to cover all alternatives, modifications and equivalent arrangements as may be included within the spirit and scope of the invention as defined by the appended claims.

The alkylamines with which the present invention are concerned are, as stated previously, compounds in which the alkoxy group has from 1 to 5 carbon atoms and the alkylamine group has from 2 to 3 carbon atoms. Representative compounds within this group include methoxyethylamine, ethoxyethylamine, methoxypropylamine, isopropoxypropylamine, and butoxypropylamine.

These alkoxy alkylamines, as will appear, have an unusually high capacity for absorbing carbon dioxide, as well as an exceptionally high efficiency of the absorption, particularly at high gas flow rates.

Absorption of the carbon-14 dioxide containing gas, typically as emitted from a sample combustion device such as described in Kaartinen U.S. Pat. No. 485,565, may be effected with any suitable absorption apparatus. The condenser of Kaartinen U.S. Pat. No. 3,542,121 is particularly effective. In any event, it is merely necessary to distribute the absorbent in a manner that it may be exposed to the stream of carbon-14 containing gas, desirably while the absorbent is distributed as a thin film.

After effecting the absorption, the absorbent and dissolved carbamate are removed from the absorber (optionally by washing with a portion of the aromatic hydrocarbon used as primary scintillation solvent), and formed into a scintillation mixture for liquid scintillation counting. The primary solvent in such mixtures is ordinarily a monocyclic aromatic hydrocarbon, usually toluene, although benzene, one of the xylenes, ethylbenzene, p-cymene, mesitylene, phenyl cyclohexane, etc. may be used.

In addition to the primary aromatic hydrocarbon solvent the scintillation mixture will normally contain one or more scintillators, or fluors, which are organic compounds that effect or enhance the conversion of ionizing radiation to light flashes. Such well known materials as PPO or POPOP are commonly employed as scintillators of fluors.

In addition, various other ingredients may be added to the scintillation mixture as desired for particular purposes. Thus, wave length shifters such as bis-MSB may be added; these effectively displace the wave length of the scintillations to conform more nearly with the optimum sensitivity of a light scintillation detecting phototube. Other materials such as anthracene, naphthalene, etc. may also be added, although, as will be apparent, these additives form no basis of the present invention.

The relative proportion of alkaline absorbent to monocyclic aromatic hydrocarbons may vary widely, provided only that a single phase is maintained at the conditions of temperature prevelant during scintillation counting. As will appear, proportions of one part by volume of alkoxy alkylamine to one part of toluene, to three of alkoxy alkylamine to one of toluene exhibit excellent results, although this proportion may be varied from as little as 1:5 to 5:1, or more, depending on the identity of the particular alkoxy alkylamine and of the particular monocyclic aromatic hydrocarbon primary solvent.

To demonstrate the advantages of the present invention a series of tests was conducted. In each case the alkaline absorbent was saturated at 20°–23° C. with nonradioactive carbon dioxide to 100 percent absorption, as determined by weight increase. The resulting absorbent-carbamate mixture was then formed into a scintillation mixture with a "scintillator," in indicated amounts, composed of one liter reagent grade toluene containing 15 grams of P.P.O. and 1 gram of bis-MSB. A constant amount of radiolabeled toluene-14 was employed in each sample as an internal standard, and the several samples counted in a Packard Tri-Carb liquid scintillation spectrometer.

The following results were obtained.

COUNTING EFFICIENCIES OF VARIOUS ABSORBER-SCINTILLATOR MIXTURES

| Absorber Scintillator | Amount in cc | Mmol $CO_2$ | A.E.S. | dpm | cpm | Efficiency % | Figure of Merit (% Eff. × Mmol $CO_2$) |
|---|---|---|---|---|---|---|---|
| Ethanolamine Scintillator | 5 / 5 | 41.0 | .7506 | 4560 | 23 | 0,05 | 2 |
| Ethanolamine Scintillator Methylalcohol | 5 / 5 / 10 | 41.0 | .1881 | 4560 | 2771 | 62 | 2540 |
| Methoxyethylamine Scintillator | 10 / 10 | 58.0 | .4801 | 4560 | 3870 | 85 | 4930 |
| Methoxyethylamine Scintillator | 11.70 / 8.30 | 67.9 | .4059 | 4560 | 3640 | 80 | 5432 |
| Methoxyethylamine Scintillator | 12.85 / 7.15 | 74.5 | .3603 | 4560 | 3509 | 77 | 5736 |
| Methoxyethylamine Scintillator | 13.75 / 6.25 | 79.8 | .3450 | 4560 | 3318 | 73 | 5825 |
| Methoxyethylamine Scintillator | 14.45 / 5.55 | 83.8 | .2945 | 4560 | 3131 | 69 | 5782 |
| Methoxyethylamine Scintillator | 15.00 / 5.00 | 87.0 | .2560 | 4560 | 2888 | 63 | 5501 |
| Ethoxyethylamine Scintillator | 10 / 10 | 48.8 | .4935 | 4560 | 3879 | 85 | 4148 |
| Methoxypropylamine Scintillator | 10 / 10 | 48.8 | .4702 | 4560 | 3790 | 84 | 4099 |
| Isopropoxypropylamine Scintillator | 10 / 10 | 37.2 | .5004 | 4560 | 3965 | 87 | 3236 |
| Butoxypropylamine Scintillator | 10 / 10 | 33.2 | .5160 | 4560 | 4020 | 88 | 2921 |

Scintillator: 15 g P.P.O.
1 g bis-MSB
in 1 liter reagent grade Toluene

The absorption efficiency of a series of amines was evaluated from the standpoint of their ability to absorb non-radioactive carbon-dioxide from gas streams at various flow rates.

For each test the same un-cooled glass carbon dioxide reaction column was used. 5 milliliters of amine trapping agent was pipetted into the column, and oxygen containing 30.9 percent of carbon dioxide (non-radioactive) was passed upward through the column until breakthrough was observed. The breakthrough time or point was determined by passing the exit gas through a barium hydroxide solution and detecting turbidity.

Flows of 200, 400, 600 and 800 cc/min. of the oxygen-carbon dioxide gas mixture were used. At the end of each step, all of the amine solution was washed from the column; washing was completely effective, in the case of the alkoxy alkylamines, with a toluene wash. This was possible even though the amine had reached and exceeded the theoretical carbon dioxide absorption level of 50 percent, that is, one mol of carbon dioxide to two mols of amine. In the case of ethanolamine, the resulting carbamate required a methanol rinse in order to be compatible with a toluene scintillator mixture.

The data are presented below.

ABSORPTION EFFICIENCY OF
R-OXYALKYLAMINES FOR CARBON DIOXIDE

| Amine | Flow Rate, cc/min. | | | |
|---|---|---|---|---|
| | 200 | 400 | 600 | 800 |
| Ethanolamine | 33.4 | 31.7 | 30.5 | 29.5 |
| Methoxyethylamine | 63.3 | 58.2 | 59.5 | 55.1 |
| Ethoxyethylamine | 56.0 | 58.1 | 61.2 | 58.9 |
| Methoxypropylamine | 53.1 | 56.2 | 54.3 | 53.6 |

Thus it is apparent that there has been provided, in accordance with the invention, an outstanding liquid alkaline absorbent. The absorbent is unusually effective for absorbing carbon-14 dioxide, particularly in conjunction with a radioactive sample combustion apparatus, and requires no alcohol or other added solvent to form a miscible scintillation mixture with an aromatic hydrocarbon solvent.

I claim as my invention:

1. In a method of absorbing carbon-14 dioxide in a liquid alkaline absorbent preparatory to liquid scintillation counting of said carbon-14 in a scintillation mixture comprising a monocyclic aromatic hydrocarbon as primary solvent, the improvement comprising effecting said absorption with a primary alkoxy alkylamine wherein the alkoxy group has from 1 to 5 carbon atoms and the alkylamine group has from 2 to 3 carbon atoms.

2. Method of claim 1 wherein said primary alkoxy alkylamine is methoxyethylamine.

3. Method of claim 1 wherein said primary alkoxy alkylamine is ethoxyethylamine.

4. Method of claim 1 wherein said primary alkoxy alkylamine is methoxypropylamine.

5. Method of claim 1 wherein said primary alkoxy alkylamine is isopropoxypropylamine.

6. Method of claim 1 wherein said primary alkoxy alkylamine is butoxypropylamine.

7. Method of claim 1 wherein said scintillation mixture is free of an alcohol.

* * * * *